United States Patent
Caslin et al.

(10) Patent No.: US 7,197,560 B2
(45) Date of Patent: Mar. 27, 2007

(54) COMMUNICATIONS SYSTEM WITH FRAUD MONITORING

(75) Inventors: Michael Caslin, Colorado Springs, CO (US); John Hans Van Arkel, Colorado Springs, CO (US); Arthur Lance Springer, Waterloo, IA (US)

(73) Assignee: MCI, LLC, Basking Ridge, NJ (US)

( * ) Notice: Subject to any disclaimer, the term of this patent is extended or adjusted under 35 U.S.C. 154(b) by 802 days.

(21) Appl. No.: 10/103,279

(22) Filed: Mar. 20, 2002

(65) Prior Publication Data

US 2002/0188712 A1    Dec. 12, 2002

Related U.S. Application Data (60) Provisional application No. 60/276,923, filed on Mar. 20, 2001, provisional application No. 60/276,953, filed on Mar. 20, 2001, provisional application No. 60/276,955, filed on Mar. 20, 2001, provisional application No. 60/276,954, filed on Mar. 20, 2001.

(51) Int. Cl.
*G06F 15/173* (2006.01)

(52) U.S. Cl. .............. 709/224; 709/227; 709/246; 379/189; 379/114.14

(58) Field of Classification Search ............ 709/224, 709/227, 230, 246; 379/189, 114.14
See application file for complete search history.

(56) References Cited

U.S. PATENT DOCUMENTS

| | | | |
|---|---|---|---|
| 5,463,681 A * | 10/1995 | Vaios et al. ............... 379/189 |
| 5,606,604 A | 2/1997 | Rosenblatt et al. |
| 5,627,886 A * | 5/1997 | Bowman ............... 379/189 |
| 5,706,338 A * | 1/1998 | Relyea et al. ............. 379/189 |
| 5,768,354 A * | 6/1998 | Lange et al. ............... 379/189 |
| 5,907,602 A * | 5/1999 | Peel et al. ................. 379/189 |
| 5,907,803 A * | 5/1999 | Nguyen .................... 455/410 |
| 5,953,653 A * | 9/1999 | Josenhans et al. ........ 455/410 |
| 5,995,604 A | 11/1999 | Chan et al. |
| 6,064,653 A * | 5/2000 | Farris ....................... 370/237 |
| 6,188,753 B1 * | 2/2001 | Afsar et al. ............. 379/114.14 |
| 6,219,538 B1 * | 4/2001 | Kaminsky et al. ........ 455/410 |
| 6,226,364 B1 * | 5/2001 | O'Neil ..................... 379/114.2 |
| 6,233,313 B1 * | 5/2001 | Farris et al. ............... 379/126 |
| 6,266,525 B1 * | 7/2001 | Peterson .................. 455/410 |
| 6,327,352 B1 * | 12/2001 | Betts et al. ................ 379/189 |
| 6,377,672 B1 * | 4/2002 | Busuioc .................... 379/189 |
| 6,600,733 B2 * | 7/2003 | Deng ........................ 370/352 |
| 6,614,781 B1 * | 9/2003 | Elliott et al. .............. 370/352 |
| 6,721,284 B1 * | 4/2004 | Mottishaw et al. ...... 379/114.01 |
| 6,873,617 B1 * | 3/2005 | Karras ...................... 370/389 |

OTHER PUBLICATIONS

Handley et al., "SIP: Session Initiation Protocol", Internet Engineering Task Force, Request for Comment 2543, Mar. 1999.

* cited by examiner

*Primary Examiner*—Philip B. Tran (57) ABSTRACT

A fraud monitoring system is disclosed for a communications system. The fraud monitoring system analyzes records of usage activity in the system and applies fraud pattern detection algorithms to detect patterns indicative of fraud. The fraud monitoring system advantageously accommodates transaction both records resulting from control of a packet-switched network and those from a circuit-switched network gateway.

16 Claims, 7 Drawing Sheets

| Field | Ref |
|---|---|
| CALL START TIME | 602 |
| CALL STOP TIME | 604 |
| USER IDENTITY | 606 |
| ORIGINATING INFO | 608 |
| TERMINATING INFO | 610 |
| PRETRANSLATED DIGITS | 612 |
| CALL TYPE | 614 |
| CALL DISPOSITION | 616 |
| BILLED NUMBER | 618 |
| SERVICE TYPE | 620 |
| CORP_ID | 622 |
| ORIGIN SWITCH/TRUNK | 624 |
| INGRESS GW IP ADDRESS | 626 |
| EGRESS GW IP ADDRESS | 628 |
| BYTES RECEIVED | 630 |
| BYTES SENT | 632 |
| SESSION_ID | 634 |
| CONN_ID | 636 |
| REMOTE ACCESS NO. | 638 |

FIG. 7

COMMUNICATIONS SYSTEM WITH FRAUD MONITORING

CROSS REFERENCE TO RELATED CASES

This application is related to, and claims the benefit of the earlier filing date under 35 U.S.C. § 119(e) of, U.S. Provisional Patent Application No. 60/276,923, filed Mar. 20, 2001, entitled "IP Communications," U.S. Provisional Patent Application No. 60/276,953, filed Mar. 20, 2001, entitled "IP Communications," U.S. Provisional Patent Application No. 60/276,955, filed Mar. 20, 2001, entitled "IP Communications," and U.S. Provisional Patent Application No. 60/276,954, filed Mar. 20, 2001, entitled "IP Communications"; the entireties of which are incorporated herein by reference.

TECHNICAL FIELD

The present invention relates to controlling fraudulent use of communications services and, more particularly, to the detection of fraudulent activities in a data transport network.

BACKGROUND

The proliferation of data transport networks, most notably the Internet, is causing a revolution in telephony and other forms of real-time communication. Businesses that have been accustomed to having telephony traffic and data traffic separately supported over different systems and networks are now moving towards so-called "converged networks" wherein telephone voice traffic and other forms of real-time media are converted into digital form and carried by a packet data network along with other forms of data. Now that the technologies are feasible to support it, voice over data transport offers many advantages in terms of reduced capital and operating costs, resource efficiency and flexibility.

For example, at commercial installations, customer premise equipment investments are substantially reduced as most of the enhanced functions, such as PBX and automatic call distribution functions, may reside in a service provider's network. Various types of gateways allow for sessions to be established even among diverse systems such as IP phones, conventional analog phones and PBXs as well as with networked desktop computers.

A new generation of end user terminal devices are now replacing the traditional telephones and even the more recent PBX phone sets. These new sets, such as those offered by Cisco Systems, Inc. and Pingtel Corporation, may connect directly to a common packet data network, via an Ethernet connection for example, and feature large visual displays to enhance the richness of the user interface.

Even before such devices were developed, computers equipped with audio adapters and connected to the Internet were able to conduct some rudimentary form of Internet telephony, although the quality was unpredictable and often very poor. The emphasis now is upon adapting internet protocol (IP) networks and other packet transport networks to provide reliable toll-quality connections, easy call set-up and enhanced features to supply full-featured telephony as well as other forms of media transport. Some other types of media sessions enabled by such techniques may include video, high quality audio, multi-party conferencing, messaging and collaborative applications.

Of course, as a business or residential communications subscriber begins using such voice-over-packet communications to replace conventional telephony, there will naturally be an expectation that the quality of the connections and the variety of services will be at least as good as in the former telephone network. There is also an expectation that the new types of networks will be less susceptible to fraudulent use of communications service—or at least no worse than their predecessors.

However, employing a packet data transport for telephony introduces new vulnerabilities beyond those experienced with the traditional circuit-switched telephone network. The concern over security of communications in the public Internet is well known and has received considerable attention in light of countless identity thefts, hacking attacks, viruses, denial-of-service attacks, security breaches and other threats to reliable, confidential communications. These threats take on further significance as, in the case of packet telephony, the traffic streams are metered and revenue-bearing.

In response to these threats, a growing array of security countermeasures (firewalls, NAT, secure connections, encryption schemes, secure Internet protocol (IPsec), vulnerability probes) have been developed to defend against such crippling attacks on data networks.

Of course, any of these security measures that were spawned by data network security may be beneficial to the prevention of attacks in telephony data networks. One area of particular vulnerability for some packet telephony systems stems from the fact that signaling, bearer traffic, and network management communications all share the same transport network. The call control systems communicate among themselves and to the network elements (such as gateways) using the same network that carries packets of customer data. To put things simply, one may send data to any point in a packet network as long as the address of the point is known. The fact that the call control servers are coupled through the transport network opens the possibility that a fraud perpetrator might attempt to communicate directly with a network server, either to impede the operation of the server or to send mock communications requests so as to fool the server into providing free communications services. Fortunately, network security measures, such as the use of IPsec tunnels between legitimate endpoints, are largely effective against these kinds of attacks.

While data network security measures may be employed to help defend against certain types of attacks against a telephony data network, there are a variety of fraud schemes that are not detected or prevented by such measures.

Various fraud schemes are known by which fraud perpetrators are able to steal communications services. Perpetrators have been able to steal calling card numbers, open false accounts, or otherwise manipulate equipment or people to get services without paying. Many of the possible fraud schemes have been well characterized in the PSTN and various techniques have been developed for detecting and preventing such abuses.

Unfortunately, there is a common misconception among those in the industry that the use of sufficient data network security measures should prevent all manner of abuse and fraud, even in a packet telephony environment. In truth, the role of fraud monitoring can be distinct from, but complementary with, network security. Network security provides mechanisms (e.g., firewalls, authentication services, user IDs/passwords, etc.) to ensure that only authorized users gain access to network services. These security mechanisms have protection against internal abuse by authorized users and social engineering situations. As a complementary capability, fraud monitoring provides a view into the services used on the network to ensure that none of the security mechanisms have been compromised or abused. Fraud monitoring facilitates identification of vulnerabilities in the network, protects a commercial customer by minimizing unauthorized use, and protects the service provider against revenue loss.

In summary, network security focuses on fraud prevention, while fraud monitoring focuses on fraud detection. These network concerns must be addressed before customers invest in the adoption of new services and technologies. Customers are attracted to a converged solution because of the potential for new services and enhance functions, but are apprehensive about new security risks and avenues of fraud.

SUMMARY

The present invention meets the need for a fraud monitoring capability to complement other security measures in a voice-over-packet communications system.

To the extent that a packet telephony network operates analogously to a traditional network and many of the same fraud schemes apply, the present invention advantageously adapts an existing fraud detection system for use with a packet telephony network. This means that existing tools and practices developed for the traditional telephone network may be immediately applied in the realm of packet telephony.

Additionally, where packet telephony introduces new aspects or surfaces new sources of information beyond what was observed in traditional telephony, the present invention provides for the collection of new indicators and the implementation of new detection methods.

In another aspect, the present invention also provides for a single fraud monitoring platform to serve both conventional and packet-switched telephony systems. In particular, the present invention provides for the collection, correlation and collective processing of usage activity information derived from both circuit-switched and packet-switched domains. This is a novel capability for reviewing all aspects of calls, even those that involve gateways and are carried over both forms of transport.

In accordance with an aspect of the present invention, network servers performing call processing, or more appropriately "session processing", in the packet telephony system create transaction detail records reflecting each call or session request that was handled by the server. What is recorded may include network addresses, call dispositions, feature invocations, time of day, etc. These transaction detail records are forwarded through an operations support system and eventually processed by a fraud monitoring engine that looks for various patterns of fraud. In accordance with a preferred embodiment, such records are provided in an XML (extensible Mark-up Language) format.

In another aspect of the present invention, network gateways, which adapt signaling and bearer channels among circuit-switched and packet-switched networks, also generate call detail records (CDRs) of the more traditional type and forward those to a collection process. These CDRs convey information about PSTN-types of events. Eventually, these CDRs are correlated with the records from the network servers and the fraud monitoring system is then able to get an overall picture of each call, even when a call involves both types of networks.

To facilitate use of such CDRs, such as for correlation to packet network events, the present teachings provide that CDRs may be augmented in a novel fashion with additional information having particular significance in a mixed packet-switched and circuit-switched environment.

While the present invention is shown and described in the context of packet-switched telephony, it will be apparent that it may be similarly applicable to other forms of communication, such as video conferencing or other data streaming, where a perpetrator seeks to steal network resources.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EXEMPLARY EMBODIMENT

In the following description, well-known structures and devices may be shown in block diagram form or otherwise summarized in order to avoid unnecessarily obscuring the present invention. For the purposes of explanation, numerous specific details are set forth in order to provide a thorough understanding of the present invention. It should be understood however that the present invention may be practiced in a variety of ways beyond these specific details.

For example, although the present invention is discussed in the context of the Session Initiation Protocol (SIP) and an Internet Protocol (IP)-based network, one of ordinary skill in the art will recognize that the present invention may be generally applicable to other equivalent or analogous communication protocols (ITU H.323) or communications networks (ATM, frame relay, etc.)

Fraud vulnerabilities in business communications systems largely involve the following: abuse by employees or ex-employees, subscription fraud, remote access fraud, misconfigured dialing plans, and social engineering. Customer Premise Equipment (CPE)-related fraud occurs when a third party gains unauthorized access to a Private Branch eXchange (PBX) switch and "steals dial-tone" to make outgoing calls, or an employee abuses long distance calling or other costly PBX-provided features for non-business purposes. These outgoing calls are charged back to the owner of the CPE regardless of the origination of the call (on-network or off-network).

In the case of subscription fraud, a small business may "set up shop" with false credentials with no intention of paying. The delay in the service provider recognizing this situation gives the perpetrator time to accumulate substantial charges.

In the case of remote access fraud, an unauthorized user may steal, or determine by "hacking", authentication information that permits access to the network, such as SIP phone user IDs and or passwords.

Fraud relating to a "leaky PBX" may stem from a customer improperly configuring the PBX such that a certain feature of the PBX may be enabled and compromised by a former employee. Additionally, incorrectly setting dialing plan configurations may result in unintended privileges to certain users; for example, a department can place international calls, although its dialing plan should only permit them to call domestically.

Social engineering refers to the practice of obtaining information of services through a person who answers a call (such as a PBX operator) by pretending to be a legitimate caller in need of assistance. For example, a caller from an outside line is forwarded to a company operator and convinces the operator that the user is an employee who needs to make an off-network call. It is observed that business customers are generally subjected to PBX hacking, internal abuse, and social engineering.

Preventive measures have been proposed or implemented to reduce the susceptibility of such networks on several fronts. Some of these measures address "low-level" vulnerabilities, such as the exposure of an IP-addressable resource to an overwhelming influx of data packets. An example of measures taken in a data network to prevent these so-called "denial-of-service" attacks is described in the following copending patent applications which are hereby incorporated by reference in their entireties: U.S. patent application Ser. No. 10/023,331, filed on Dec. 17, 2001, entitled "Virtual Private Network (VPN)-Aware Customer Premises Equipment (CPE) Edge Router" by McDysan; U.S. patent application Ser. No. 10/023,043, filed on Dec. 17, 2001, entitled "System, Method and Apparatus That Employ Virtual Private Networks to Resist IP QoS Denial of Service Attacks" by McDysan et al.; and U.S. patent application Ser. No. 10/023,332, filed on Dec. 17, 2001, entitled "System, Method and Apparatus That Isolate Virtual Private Network (VPN) and Best Effort Traffic to Resist Denial of Service Attacks" by McDysan.

On a different front, the aforementioned vulnerability introduced by having call control elements coupled through the transport network is addressed by the following co-pending application: U.S. patent application Ser. No. 10/099,316, filed on Mar. 15, 2002, entitled "Method of and System for Providing Intelligent Network Control Services In IP Telephony" by Gallant et al., the content of which is incorporated by reference in its entirety.

On yet another front, an example of higher level service processing to curtail fraud or even inadvertant abuse, in the context of advanced features may be termed "feature-associated call screening." It is possible for call forwarding and certain other features to complete calls that would otherwise be blocked, such as costly international calls. At least one approach for preventing this circumvention of desired screening is described in the following co-pending patent applications which are hereby incorporated by reference herein in their entireties: U.S. patent application Ser. No. 10/097,592, filed on Mar. 15, 2002, entitled "Selective Feature Blocking in a Communications Network" by Gallant; and U.S. patent application Ser. No. 60/364,670, filed on Mar. 15, 2002, entitled "Featuring Blocking in Communication Systems" by Gallant et al.

Of course, it is desirable that security measures may not be so extreme as to impede legitimate use of the communications system. Special approaches may be appropriate to draw a compromise between usefulness of the system and absolute security. For example, in some environments, such as a very publicly accessible service business, it may be appropriate to liberally allow calls from parties who are not authenticated through the network. In other environments, such as a defense contractor, it may be more important to restrict the reach of inbound calls. Such scenarios are described further in U.S. patent application Ser. No. 10/097, 748, filed on Mar. 15, 2002, entitled "Caller Treatment in a SIP Network" by Gallant et al., the content of which is incorporated by reference in its entirety (non-trusted user).

Figure 1:
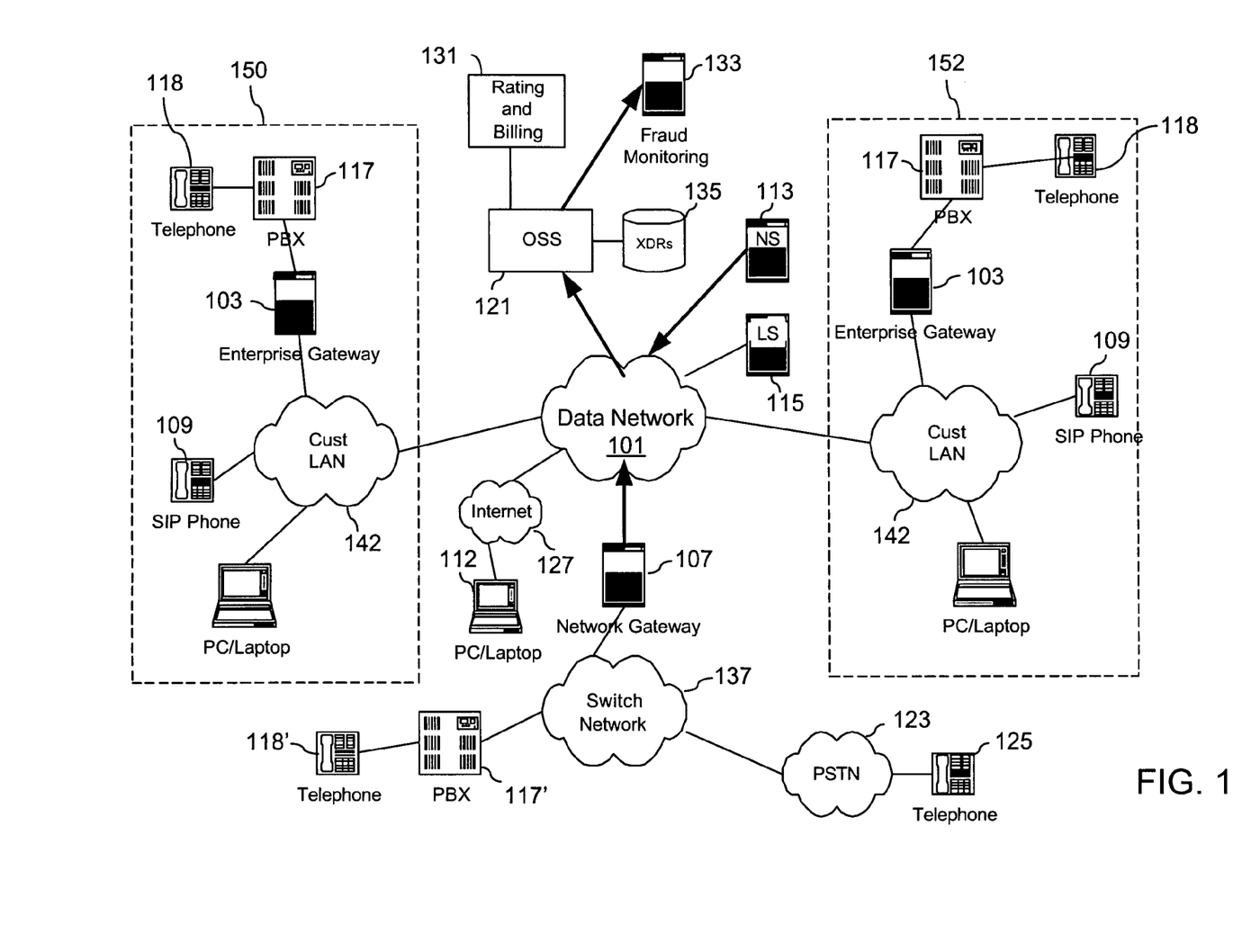
FIG. 1 is a diagram of a data communications system capable of supporting telephony services and comprising means for monitoring usage activities in accordance with an exemplary embodiment of the present invention.

FIG. 1 shows a diagram of a data communications system generally capable of supporting telephony services, in accordance with an exemplary embodiment of the present invention. The communication system 100 includes a packet data transport network 101, which in an exemplary embodiment is an Internet Protocol (IP) based network. System 100 provides the ability to establish communications among various terminal equipment coupled thereto, such as telephone 125, PBX phone 118 and SIP phone 109. In practice, there may be thousands or millions of such terminal devices served by one or more systems 100.

As used herein, the term "SIP phone" refers to any client (e.g., a personal computer, a web-appliance, etc.) that is configured to provide SIP phone functions. The SIP phones 109 may take the form of standalone devices—e.g., a SIP phone may be designed and configured to function and appear like a Plain Old Telephone Service (POTS) telephone station. A SIP client 111, however, is a software client and may that run, for example, on a conventional personal computer (PC) or laptop computer. From a signaling perspective, these devices 109, 111 may operate quite similarly, with the main differences relating to the user interface. Unless otherwise stated, it is recognized that the functionalities of both the SIP phones 109 and the SIP client 111 are comparable and that the network operates similarly with either type of device.

System 100 is able to support large enterprise customers who maintain multiple locations having telephony and data transport requirements. For example, in FIG. 1, a first customer site 150 and a second customer site 152 are depicted, each comprising telephones 118 and PBXs 117. These may be customer sites of the type that were traditionally coupled through a Class 3 network, such as switch network 137, via the PBXs 117.

In accordance with more recent technologies, customer sites 150 and 152 further comprise data communications equipment, namely local area networks (LANs) 140 and 142, SIP phones 109, and PC clients 111. At each customer site, an enterprise gateway 103 is provided to allow users at telephones 118 through PBXs 117 to readily make calls to and receive calls from users of SIP phones 109 and PC clients 111.

A gateway is a device that allows divergent transport networks to cooperatively carry traffic. A gateway often provides for interoperation at two levels—between different signaling schemes and between different media forms. For example, network gateway 107 may adapt between the SS7 signaling of the telephone network and SIP or H.323 protocols used by the data network. At the same time, network gateway adapts analog or PCM-encoded voice signals in a telephone bearer channel to a packetized data streams suitable for transport over data network 101.

Enterprise gateways 103 adapt between PBX signals and data signals for transport over a data network such as LAN 140 or the service provider's network 101. As a signaling interface to PBX 117, enterprise gateway 103 may use Integrated Digital Services Network (ISDN), Circuit Associated Signaling (CAS), or other PBX interfaces (e.g., European Telecommunications Standards Institute (ETSI) PRI, R2). As shown, enterprise gateway 103 provides connectivity from a PBX 117, which contains trunks or lines often for a single business customer or location (e.g., PBX phones 118). Signaling for calls from PBX 117 into the IP network comprises information which uniquely identifies the customer, trunk group, or carrier. This allows private numbers to be interpreted in their correct context.

By virtue of the service provider's data network 101, any of the users at customer site 150 may readily communicate with those at site 152. It is also conceivable that data network 101 may be coupled to the public Internet 127, opening the possibility that communications might be established with PC clients 112, or the like, that are not within either customer site 150 or 152.

Network gateway 107, introduced earlier, is shown to adapt data network 101 to a telephone network 137 which may comprise a network of Class 3 telephone switches, for example. PBX 117' and telephones 118' may be coupled to network 137 in the more traditional manner of a VPN dedicated access line. Furthermore, network 137 is shown coupled by a trunk to the PSTN 123, representing the typical Class 5 local telephone exchanges. A plain analog phone 125 or other telephone (pay phone) may be connected to PSTN 123 through a subscriber loop.

As shown in FIG. 1, network gateway 107 enables calls from telephones 118' and 125 to any of PBX-connected phones 118, SIP phones 109 or PC clients 111, assuming system 100 gives such privileges. Any combination of calls from one type of phone to another may readily be envisioned, many of which involve the traversal of network gateway 107 and other elements.

Both SIP phones 109 and SIP clients 111 preferably support user log-in. By default, a given user may be associated with a particular communications terminal (telephone, mobile phone, pager, etc.) in the traditional sense. In addition, the user may approach one of the newer types of IP phone appliances and register his presence to receive calls at the given phone. Any inbound calls will then go to the most recently registered address.

Coupled with this mobility is the added aspect that a user may be known to others by multiple alternative names or "aliases." Multiple Aliases for a given user may resolve to a single user profile system 100 as described in U.S. patent application Ser. No. 10/101,389, filed on Mar. 16, 2002, entitled "User Aliases in a Communication System" by Gallant, the content of which is incorporated by reference in its entirety. Aliases may be of a variety of types including public and private telephone numbers, URLs, and SIP addresses.

From a fraud prevention standpoint, it may be considered advantageous that a unified user profile is maintained by the service provider or an authorized customer administrator, even though the user may be known by many such aliases.

To implement this mobility and to support new call control paradigms, control elements are provided in system 100 to coordinate the actions of network 101 in correctly routing traffic and executing features. In particular, system 100 comprises the important elements of a proxy server 113 (also known as a network server (NS)) and a location server (LS) 115. A typical functioning of these elements is described in IETF document RFC 2543. Location server 115 serves as a repository for end user information to enable address validation, feature status, and real-time subscriber feature configuration. Additionally, LS 115 may store system configuration information.

Figure 2:
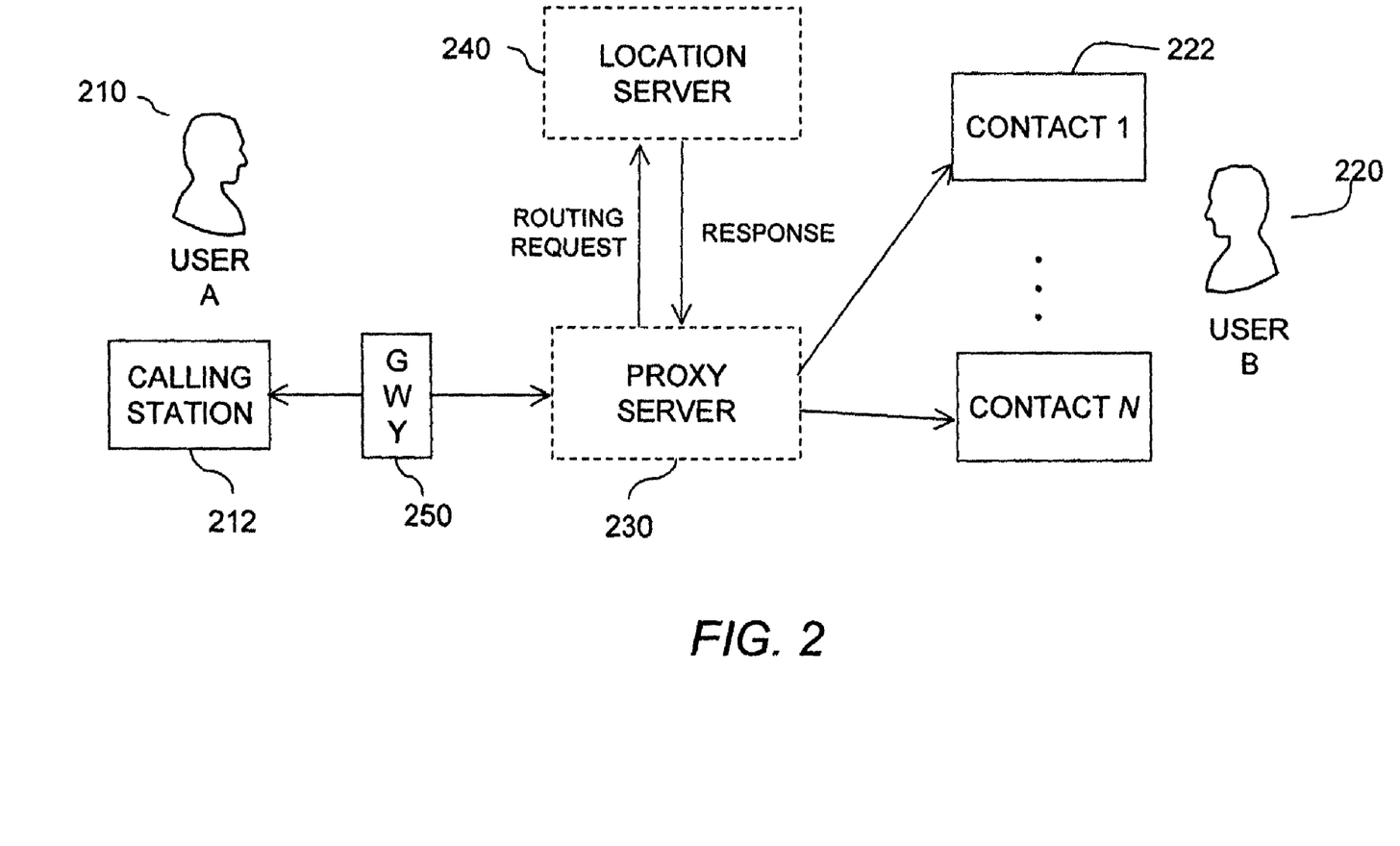
FIG. 2 is a diagram of functional elements involved in establishing a session among parties according to an exemplary embodiment of the present invention.

An example of a typical interaction among proxy 113 and location server 115 in providing service is now explained in conjunction with FIG. 2.

In FIG. 2, User A 210 desires to establish communications with User B 220. User B 220 may be reachable at any one of several addresses. These addresses or contacts may correspond to conventional telephones, SIP phones, wireless phones, pagers, etc. The list of addresses may even be changing as User B moves about and registers as being present at various terminal devices 222. The current information about User B's contact information is typically maintained in location server 240, or in some form of a "presence registry" coupled thereto.

To initiate contact, User A 210 accesses a terminal, calling station 212, and specifies User B as the destination to be reached. This expression of the specific desired destination may take the form of dialing of digits or of selecting a user name or URL-style address from a list. In some cases, User A may also be able to express what type of session is desired (video, high quality, messaging, etc.) or specify a desired quality level for the session. Once the request is specified at station 212, a SIP "INVITE" message describing the request is composed and sent to proxy server 230.

In some cases, where calling station 212 is in a different network than the transport network directly controlled by NS 113 and LS 115, the call may enter through a gateway 250. The role of gateway 250 in performing both signaling and media adaptation was described earlier.

Proxy server 230 typically forwards a request to location server 240 to retrieve one or more contacts at which User B might be reached. As described earlier, proxy server 230 consults location server 240 for a variety of purposes, such as invoking profile-controlled feature behavior and obtaining the latest known location information pertaining to User B.

Location server 240 analyzes the request and responds to proxy server 230 in one of several possible ways. Location server 240 may disallow the session if User A is not permitted to contact User B, if User B's address cannot be recognized, or if User B has a feature activated that renders User B unreachable by User A.

Location server 240 may determine that User A is allowed to contact User B and may even find multiple addresses at which User B may be reachable. If this is the case, location server 240 returns a SIP "300 Multiple Choices" message containing a list of the contacts to be tried.

Upon receiving such a response, proxy server 230 then commences trying the contacts to see if User B can successfully be reached at any of the corresponding terminals 222. This "Find-Me" functionality is usually carried out in sequence starting with the most recent registered location or following a specific order as provisioned for User B (phone then pager). In some configurations, it is conceivable that proxy server 230 may attempt all contacts in parallel. An attempt to establish contact with a terminal 222 involves sending a SIP "INVITE" to the terminal and waiting for a reply indicative of success or failure. Once a terminal 222 responds with a SIP "200 OK" message or the like, stations 212 and 222 have shared addresses and possibly negotiated session parameters and are ready to communicate, possibly through an RTP data stream. A manner in which transport network resources are coordinated to establish this "connection" of sorts through the packet network, while assuring timely packet delivery, is described in copending applications U.S. patent application Ser. No. 10/095,956, filed on Mar. 12, 2002, entitled "Edge-Based Per-Flow QoS Admission Control in a Data Network" by McDysan et al.; U.S. patent application Ser. No. 10/095,910, filed on Mar. 12, 2002, entitled "Pool-Based Resource Management in a Data Network" by McDysan et al.; and U.S. patent application Ser. No. 10/095,909, filed on Mar. 12, 2002, entitled "Policy-Based Synchronization of Per-Class Resources Between Routes in a Data Network" by McDysan et al.; the content of each which is incorporated by reference in its entirety.

The "Find-Me" feature is just one possible feature that may be supported and is of only moderate complexity compared to other possibilities. Further understanding of typical call flows in performing services may be obtained from the IETF document RFC 2543. Other examples are provided in U.S. patent application Ser. No. 60/365,738, filed on Mar. 18, 2002, entitled "System for Providing Communication Services Over a Data Network" by Gallant et al., the content of which is incorporated by reference in its entirety.

An example of a somewhat more involved feature relates to "call forwarding on screening" as is described in copending application U.S. patent application Ser. No. 10/101,199, filed on Mar. 18, 2002, entitled "Call Forwarding on Screening" by Gallant, the content of which is incorporated by reference in its entirety. Basically call forwarding on screening refers to handling disallowed inbound calls other than by merely providing a busy signal to the caller.

In the course of performing service processing, network servers may handle very complex features and may even access multiple user profiles in the course of fulfilling a single session request. An example of a more complex feature implementation of this type is provided in U.S. patent application Ser. No. 10/099,097, filed on Mar. 15, 2002, entitled "Recursive Query for Communications Network Data" by Gallant et al., the content of which is incorporated by reference in its entirety.

To further complicate matters, many features such as Find-Me and call-forward-on-screening may be invoked at the same time and may interact to some extent. This makes extensive, detailed recordation of usage activities all the more important to preventing unwanted network activity. Detailed recording can also help in troubleshooting anomalous feature behavior.

With the explanation thus far of how gateways and network servers are involved in handling traffic in system 100, it is evident that usage activity may be manifest in both such devices. These are points for measuring and monitoring network activity. The manner in which usage is monitored and reported for these elements will now be described.

Returning to FIG. 1 it is shown that system 100 further includes an Operational Support Systems (OSS) 121 to provide provisioning, billing, and network management capabilities. OSS 121 communicates with various elements, such as LS 115, to control how services are performed in system 100. This aspect may be referred to as service provisioning. For example, data stored in LS 115, such as user profile and routing data, may be altered by communications from OSS 121. OSS 121 may also serve as the portal through which users or administrators are able to change configuration settings, perhaps using a web-based user interface adapted to OSS 121.

Another important role of OSS 121 is that of network management, meaning monitoring and controlling the operational status of network elements. In a revenue bearing network, OSS 121 may also serve as a collector for billing records or so-called call detail records (CDRs). A call detail record is a form of usage activity record reflecting what has transpired in the network in the course of providing services. A CDR may be useful for billing, for traffic engineering, and for fraud monitoring. A billing function can process CDRs to ascertain billable usage by a service subscriber and accordingly calculate charges owed to the service provider. Such a rating and billing function 131 is shown coupled to OSS 121 to receive usage records from OSS 121.

Traditional CDRs have been of a rigidly established size and standard format. More recently, in the context of new developments in computing and with the advent of new service intelligence architectures, it has been recognized that transaction records may employ a more flexible XML-based structure.

Consequently, these records, known as TDRs(transaction detail records), are preferably collected by OSS 121 in an XML-type format from NS 113 and LS 115 to record many aspects of service processing events. Knowing what events have been handled by servers 113 and 115 allows functions like billing function 131 to then reconstruct the actions that were taken by system 100 in handling service requests.

For the purposes of billing, and perhaps traffic engineering, the same or similar XML-based transaction detail records (TDRs) may also be similarly collected and forwarded to rating and billing function 111. These would be handled in much the same manner as for CDRs described above. Examples of XML-based TDRs are provided in the following co-pending patent applications which are hereby incorporated by reference in their entireties: U.S. patent application Ser. No. 10/023,297, filed on Dec. 17, 2001, entitled "Method for Recording Events in an IP Network" by Vijay; and U.S. patent application Ser. No. 10/099,323, filed on Mar. 15, 2002, entitled "XML Based Transaction Detail Records" by Gallant et al.

In conjunction with such records, at least one means for facilitating proper billing of network usage is further described in copending application U.S. patent application Ser. No. 10/036,667, filed on Dec. 21, 2001, entitled "Method for Billing in a Telecommunications Network" by Gallant et al., the content of which is incorporated by reference in its entirety.

In accordance with a novel aspect of the present invention, network gateway 107 also provides a form of transaction record to be collected by OSS 121. Because of the interface to the telephone network signaling, this record resembles a traditional CDR in carrying such fields as dialed number, called number, switch and trunk IDs, etc. However, as an advantageous and novel aspect of the present invention and by virtue of its being coupled to system 100, several new and very useful additional data are added to the record that are not contemplated in the prior art. These additional data have become available and meaningful in the context of practical implementation of packet telephony using gateways.

Figure 6:
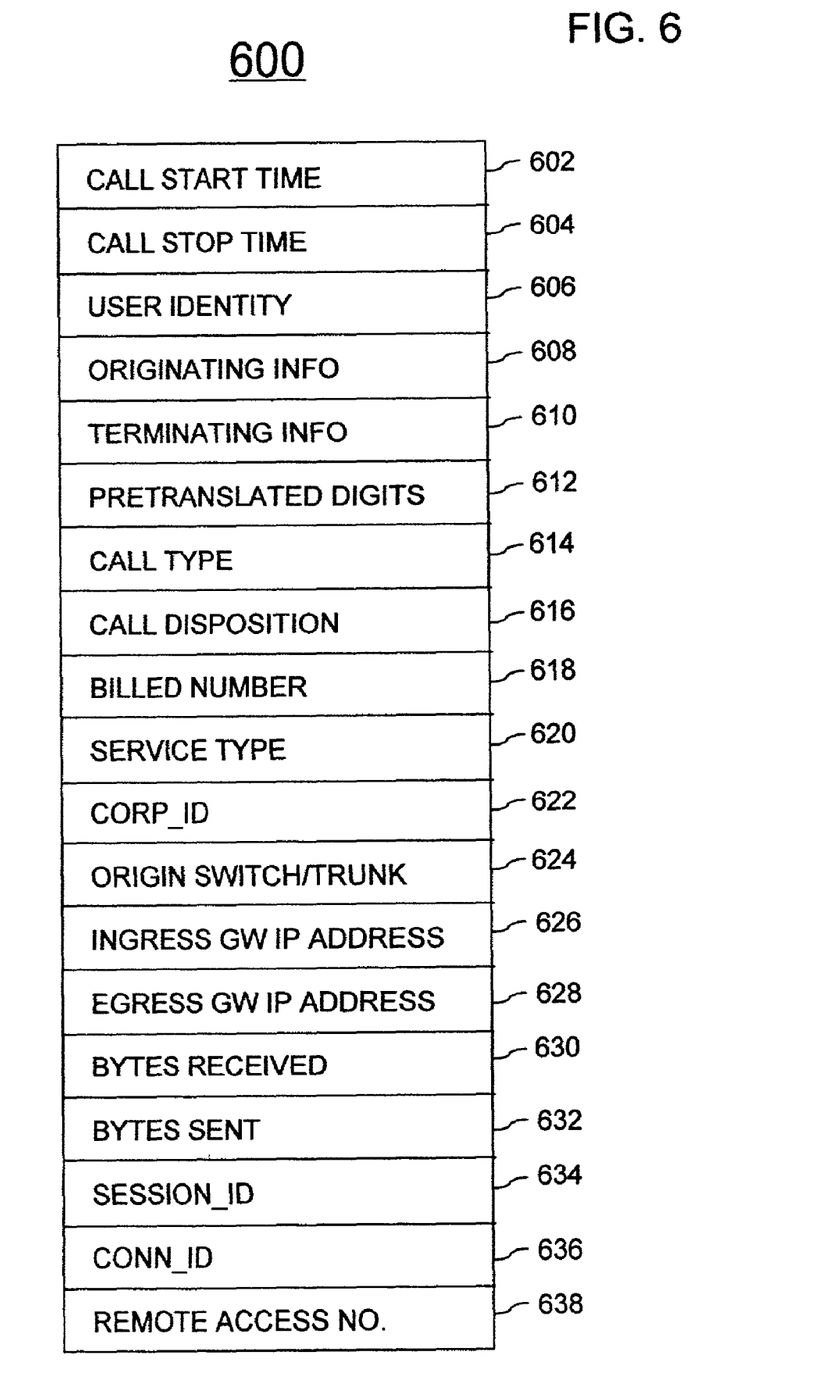
FIG. 6 is a diagram of a data structure for conveying recorded usage of a communications system in accordance with an exemplary embodiment of the present invention.

Examples of these additional data are evident in FIG. 6, which is a diagram of a data structure for conveying recorded usage of a communications system in accordance with an exemplary embodiment of the present invention.

In FIG. 6 a record 600 is shown to comprise numerous fields, the significance of which may be summarized as follows:

Call Start Time 602—The time that the service request is initiated and the time that the service session started. These two values may differ.

Call Stop Time 604—The time that the service session is disconnected.

User Identity 606—The identity (user name/id) of the user who initiated the session, if available.

Originating Information 608—Information pertaining to the originating end of the connection or session, which may be the public or private number, perhaps including a country code, from where the session originates. As appropriate, the originating IP address and/or the Ingress Gateway IP address may also be included.

Terminating Information 610—Information pertaining to the terminating end of the connection or session, which may be the public or private number, perhaps including a country code, where the session reaches or attempts to reach a terminating party. As appropriate, the originating IP address and/or the Egress Gateway IP address may also be included.

Pretranslated Digits 612—If available, the originally dialed number before undergoing number translation during feature processing. This may be different than the number to which the call ultimately terminates, especially in the case of private dialing plans.

Call Type 614—Classification based on types of terminating devices involved. Examples are phone-to-phone, phone-to-PC, PC-to-PC, etc.

Call Disposition 616—Disconnect cause or how the session terminated (destination answered, busy,ring-no anss-wer, out of service, etc.)

Billed Number 618—Party or account to be charged for usage. In the context of fraud monitoring this field affects how events are counted in the operation of some of the algorithms later described herein.

Service Type 620—Indicates services used or features invoked.

Corp_ID 622—Identification of a customer (corporation), perhaps encoded as a private dialing plan ID code.

Origin Switch/Trunk 624—Identifies the telephone network switch receiving the call from the Network Gateway.

Ingress Gateway IP Address 626—The IP address of a gateway by which the call enters the domain of network 101.

Egress Gateway IP Address 628—The IP address of a gateway by which the call leaves the domain of network 101.

Bytes Received 630—Related to the number of bytes transferred during the session from one party to another.

Bytes Sent 632—Bytes transmitted in opposite direction of Bytes Received 628.

Session_ID 634—Unique session identifier designating a session, even encompassing multiple parties or connections associated with a collective session such as a conference bridge.

Conn_ID 636—Identifies a particular "call leg" or connection in a session.

Remote Access Number 638—If applicable, a remote access number used to access the network.

Remote Access Number 638 relates to calling a DAL gateway (not shown) or other means to access VPN functions from a phone, such as a public telephone, that is not directly served by system 100. A DAL gateway may be able to service multiple VPN customers in system 100. This practice further motivates accurate recording of network transactions in detail, such as by noting the Remote Access Number when appropriate. An approach to providing shared DAL gateway resources is described further in U.S. patent application Ser. No. 10/097,971, filed on Mar. 15, 2002, entitled "Shared Dedicated Access Line (DAL) Gateway Routing Discrimination" by Gallant, the content of which is incorporated by reference in its entirety.

The examples of FIG. 6 are should not be construed to limit the many possible elements that could be useful to record. Other examples of values to record are the IP address of the proxy receiving the SIP "INVITE" message corresponding to a user's session request. It is worth noting that fields 626, 630, 632, 634, 636, 638 of structure 600 are all introduced or at least given significance by the advent of packet telephony system.

Returning again to FIG. 1, the OSS 121 is shown to interface with a fraud monitor or fraud analyzer 133, which supports packet-switched (e.g., IP-based) and switch-based monitoring functions. That is, the integrated fraud monitoring system 133, in accordance with novel aspects of the present invention, may analyze circuit-switched traffic as well as packet-switched traffic, thereby providing improved monitoring of network usage. Fraud monitoring via the integrated fraud monitoring system 133 may help prevent losses by a customer, due to customer premise abuses for which the customer may be liable, and the service provider, due to un-billable traffic abuses or liability-sharing agreements pertaining to customer premise abuse.

The fraud monitoring system 133 provides a number of functional capabilities to system 100. For example, the fraud monitoring system 133 ensures that IP-based services provided to customers offer at least a comparable level of fraud monitoring as available for circuit-switched services. The system 133 monitors and detects fraud vulnerabilities for IP network customers, which include employee abuse, illegal or unintended remote access, incorrect dialing plan configurations, compromised IP addresses/user IDs/passwords, subscription fraud, and social engineering. The coupling of fraud monitoring system 133 to the remainder of system 100 reinforces the use of network security measures by detecting patterns indicative of possible security breaches.

Figure 3:
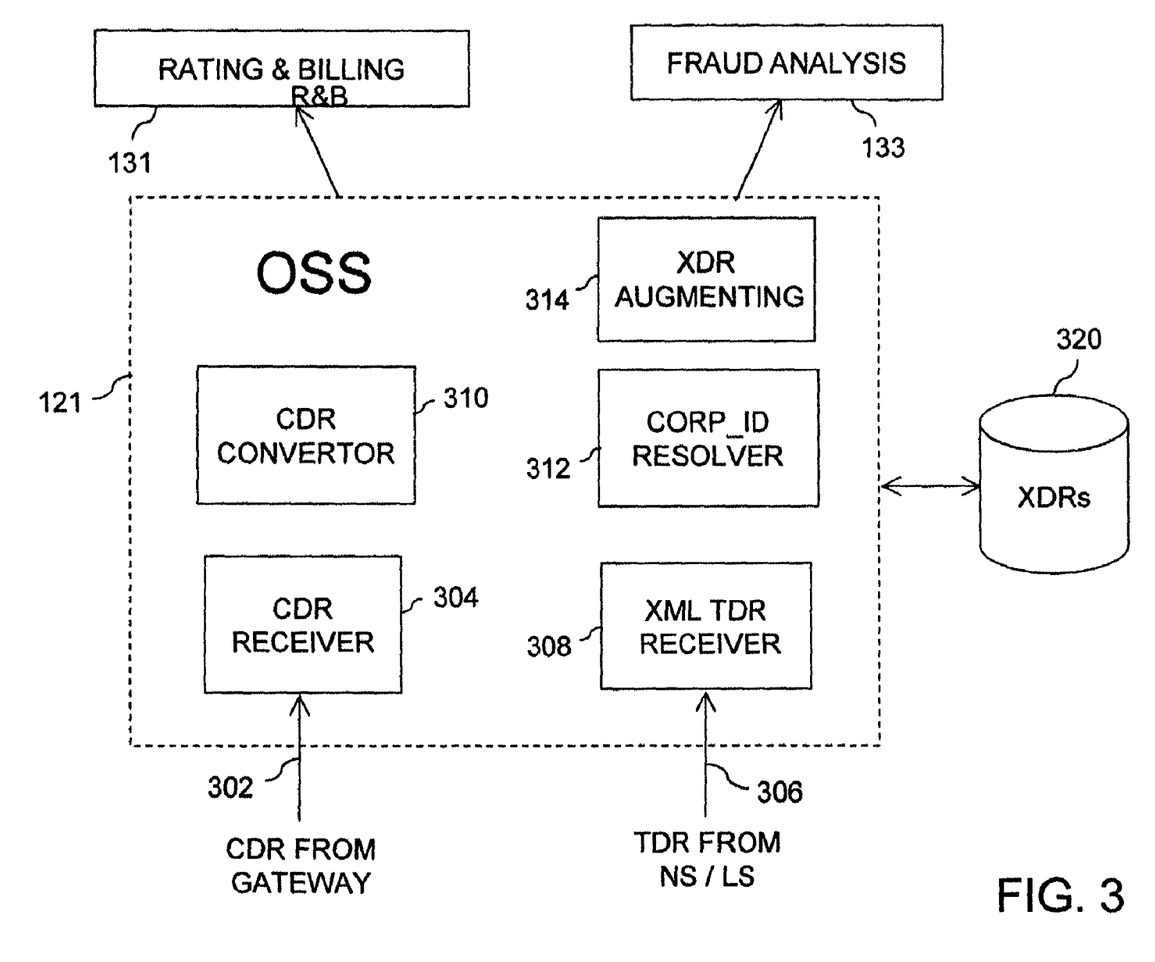
FIG. 3 is a diagram of functional elements for monitoring usage activity of a communications system in accordance with an exemplary embodiment of the present invention.

To understand the respective roles of OSS 121 and fraud monitor 133, several functional aspects are now discussed in conjunction with FIG. 3. In support of collection of transaction records, OSS 121 is shown to comprise numerous functional components. It should be understood that OSS 121 may comprise many other elements, which are not explicitly shown, to support the other OSS roles described earlier.

A temporary collection point for transactions records is depicted in FIG. 3 as data store 320. As those of skill in the art will appreciate, such records may be stored in any suitable format that does not cause the loss of essential information. In a reduction to practice, such records are stored in a format compatible with a commercial product available from Xacct Technologies. For convenience, these records are referred to herein as "XDRs" and are based upon XML. Transaction records received along inputs to OSS 121 may be accumulated in store 320 as XDRs.

In FIG. 3., OSS 121 comprises CDR receiving means 304 operates to receive CDRs from network gateway(s) along input 302. Input 302 may represent a coupling to data network 101 as was depicted in FIG. 1.

A CDR incident along input 302 is received by CDR receiver 304 and passed to a CDR-XDR converter 310. Converter 310 creates an XDR and then populates fields based on values parsed from the CDR. Many values, such as a dialed telephone number, may be simply copied from the CDR into the XDR.

Next, the XDR may be passed to a CORP_ID resolving element 312, which examines such information as the IP addresses and telephone numbers in the CDR, or perhaps the IP address of the network gateway that the CDR came from, and determines a CORP_ID corresponding to the enterprise customer to which the record pertains. This is an important part of later correlating records and performing billing and fraud monitoring.

The XDR may next be processed by an XDR augmenting means 314, whereby the CORP_ID is added to the XDR. It is contemplated that other values derived relating to the CDR may also be added at this point. The complete converted XDR may then be stored by OSS 121 in data store 320 for later retrieval.

Along with XDRs derived from CDRs received from network gateways, XML transaction detail records (TDRS) may also be received along input 306 by TDR receiver 308 and stored in data store 320. Once stored in a consistent XDR format, these records in are made available to billing function 131 and fraud monitor 133.

In a practical implementation, OSS 121 may involve communications with a variety of network elements, and perhaps among a variety of computing environments or platforms. Implementations of OSS 121 to facilitate provisioning and communications with network elements and with "back-office" functions, like fraud monitor 133, are described in the following co-pending applications: U.S. patent application Ser. No. 10/097,864, filed on Mar. 15, 2002, entitled "Operational Support System for Telecommunication Services" by Robohm et al.; U.S. patent application Ser. No. 10/097,863, filed on Mar. 15, 2002, entitled "Systems and Methods for Communicating from an Integration Platform to a Lightweight Directory Assistance" by Trivedi; U.S. patent application Ser. No. 10/097,862, filed on Mar. 15, 2002, entitled "Systems and Methods for Communicating from an Integration Platform to a Provisioning Server" by Trivedi; U.S. patent application Ser. No. 10/097,861, filed on Mar. 15, 2002, entitled "Systems and Methods for Updating IP Communication Service Attributes Using a LDAP" by Robohm; U.S. patent application Ser. No. 10/097,870, filed on March 15, 2002, entitled "Systems and Methods for Interfacing with a Billing and Account Management Unit" by Robohm et al.; U.S. patent application Ser. No. 10/097,869, filed on Mar. 15, 2002, entitled "Systems and Methods for Retrieving and Modifying Data Records for Rating and Billing Purposes" by Leskuski; U.S. patent application Ser. No. 10/097,868, filed on Mar. 15, 2002, entitled "Systems and Methods for Updating a LDAP" by Trivedi et al.; U.S. patent application Ser. No. 10/098,044, filed on Mar. 15, 2002, entitled "Systems and Methods for Collecting and Rating Contact Center Usage" by Holmes; U.S. patent application Ser. No. 10/097,865, filed on Mar. 15, 2002, entitled "Systems and Methods for Updating IP Communication Service Attributes" by Robohm; U.S. patent application Ser. No. 10/097,866, filed on Mar. 15, 2002, entitled "Systems and Methods for Communicating from an Integration Platform to a Billing Unit" by Trivedi; U.S. patent application Ser. No. 10/097,934, filed on Mar. 15, 2002, entitled "Systems and Methods for Communicating from an Integration Platform to a Profile Management Server" by Trivedi; U.S. patent application Ser. No. 10/097,935, filed on Mar. 15, 2002, entitled "Systems and Methods for Accessing and Reporting Services" by Leskuski et al.; the content of each of which is incorporated by reference in its entirety.

Figure 7:
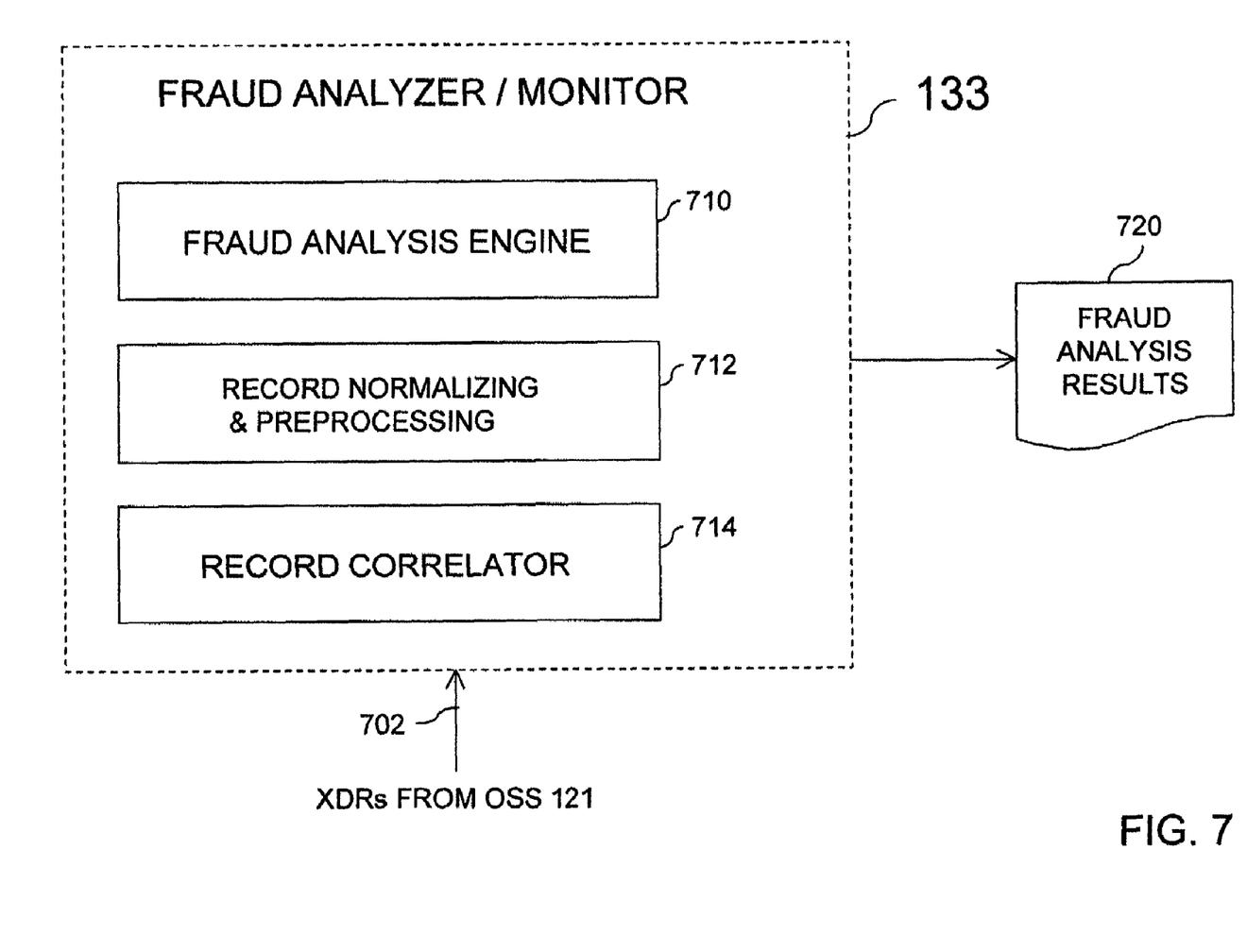
FIG. 7 is a diagram of a fraud analyzing apparatus in accordance with an exemplary embodiment of the present invention.

With reference now to FIG. 7, the manner in which fraud monitor 133 may make use of such records is now described. XDRs are provided at input 702. Record Correlator 714 serves to examine a group of XDRs and find those that all relate to the same session or service instance that transpired. For example, a call traversing both data network 101 and telephone network 137 in FIG. 1. will likely cause multiple records to be independently generated by network gateway and by one or more network servers 113, 115.

In a novel manner, Record Correlator 714 builds a composite model of service execution comprising records from both the circuit-switched domain and the packet-switched domain. It may be said at this point that the records, even arriving from diverse sources, are effectively combined into a single description of processing for each given session that occurred in the system.

Record Normalizing and Preprocessing module 712 performs simple preprocessing, such as calculating call duration based on start time and stop time of the call. Module 712 may also examine addresses or numbers to determine if a given call involved long distance or international calling. These are useful parameters for fraud analyses that follow. Module 712 may also map some fields in the XDR to a normalized format amenable to the fraud processing. It is possible that the processing of record correlation and normalizing/preprocessing may be occur in different order or be intermixed.

Finally, fraud analysis engine 710 analyzes composite information regarding usage activities reported by the input XDRs and looks for patterns of fraud. Either as comprehensive report of data, of findings, or of exceeded thresholds, engine 710 may generate a report 720 describing the results of the fraud monitoring or analysis.

Using fraud analyisis engine 710, a normalized record, in an exemplary embodiment, may be monitored for the following fraud characteristics: Long Duration Calls, Originating/Terminating Combination, Hot Originating or Terminating Number/Address, Call Velocity Based on Location, Long Duration Velocity on Originating Number/Address, Short Duration Velocity on Billed Number, Long Duration Velocity on Billed Number, and Aggregate Duration.

A Long Duration Calls alarm is generated when a single completed call meets or exceeds the long duration threshold. For example, the alarm is triggered when an off-net international IP telephony session is greater than a predetermined threshold (e.g., 2 hours).

An Originating/Terminating Combination alarm is generated if a completed call originating from X and terminating to Y exceeds a specific duration. X and Y can be countries, area codes, Gateway IP addresses, or any other predefined parameter specifying a location. For example, an alarm is generated when an off-net international IP telephony session greater than, for example, 10 minutes originates from the US and terminates to Grenada.

Another alarm type, a Hot Originating or Terminating Number/Address alarm, is generated when a call originates from a specific calling party number or IP address, or terminates to a specific called party number or IP address. This is used in alarming on calls to or from known suspect numbers—either private numbers, public numbers, or IP addresses.

A Call Velocity Based on Location type of alarm is generated when a number of completed calls over a configurable time period, originating from a user defined gateway address, and terminating to a user defined country code list, meets or exceeds the threshold. For example, a high number of calls originating from a specific Enterprise Gateway to a party-line country could signal a compromise in that part of the customer's network. In a circuit-switched environment, this type of fraud is known as "Clip-On" fraud where the calls are originating from a specific switch/trunk.

The Short Duration Velocity on Originating Number/Address alarm is generated when the number of calls over a predefined time interval from the same calling party number (or IP address), with a duration equal to or less than a configurable time value, meets or exceeds a threshold. This alarm type is used in detecting remote access fraud, for example, someone trying to hack a user ID/password, or someone trying to perform social engineering.

The Long Duration Velocity on Originating Number/Address alarm is generated when the number of calls over a predefined time interval from the same calling party number (or IP address), with a duration equal to or greater than a configurable time value, meets or exceeds a threshold. This alarm type is also used in detecting remote access fraud, for example, someone who has gained access through a compromised user ID/password.

With respect to the Short Duration Velocity on Billed Number alarm, this type of alarm is similar to the Short Duration Velocity on Originating Number/Address alarm, with the exception that the count is on calls from the same Billed Number (for example, all calls from the same originating dialing plan ID).

Likewise, the Long Duration Velocity on Billed Number alarm is similar to the Long Duration Velocity on Originating Number/Address alarm, except that the count is on calls from the same Billed Number (for example, all calls from the same originating dialing plan ID).

An Aggregate Duration alarm is generated when one or more completed calls on a billed number meets or exceeds a threshold for cumulative duration x, over an interval time, t. This alarm type is used for someone who had learned to "surf under the thresholds." For example, if it is discovered that the long duration threshold is 60 minutes, this aggregate counting will catch someone who makes a series of 59 minute calls. Unique thresholds can be established based on several system parameters (billing method, billing number, etc.) Also, because this is business traffic, thresholds can be established for business, non-business, and non-business weekend hours.

The integrated fraud monitoring system 133 may also comprise neural network and clustering Artificial Intelligence algorithms available to monitor for fraudulent calling patterns; a co-pending application (Ser. No. 10/041,549) by Tayebnejad et al., entitled "An Artificial Intelligence Trending System," filed on Jan. 10, 2002, describes the neural network and associated algorithms in detail and is incorporated herein by reference in its entirety.

Figure 4:
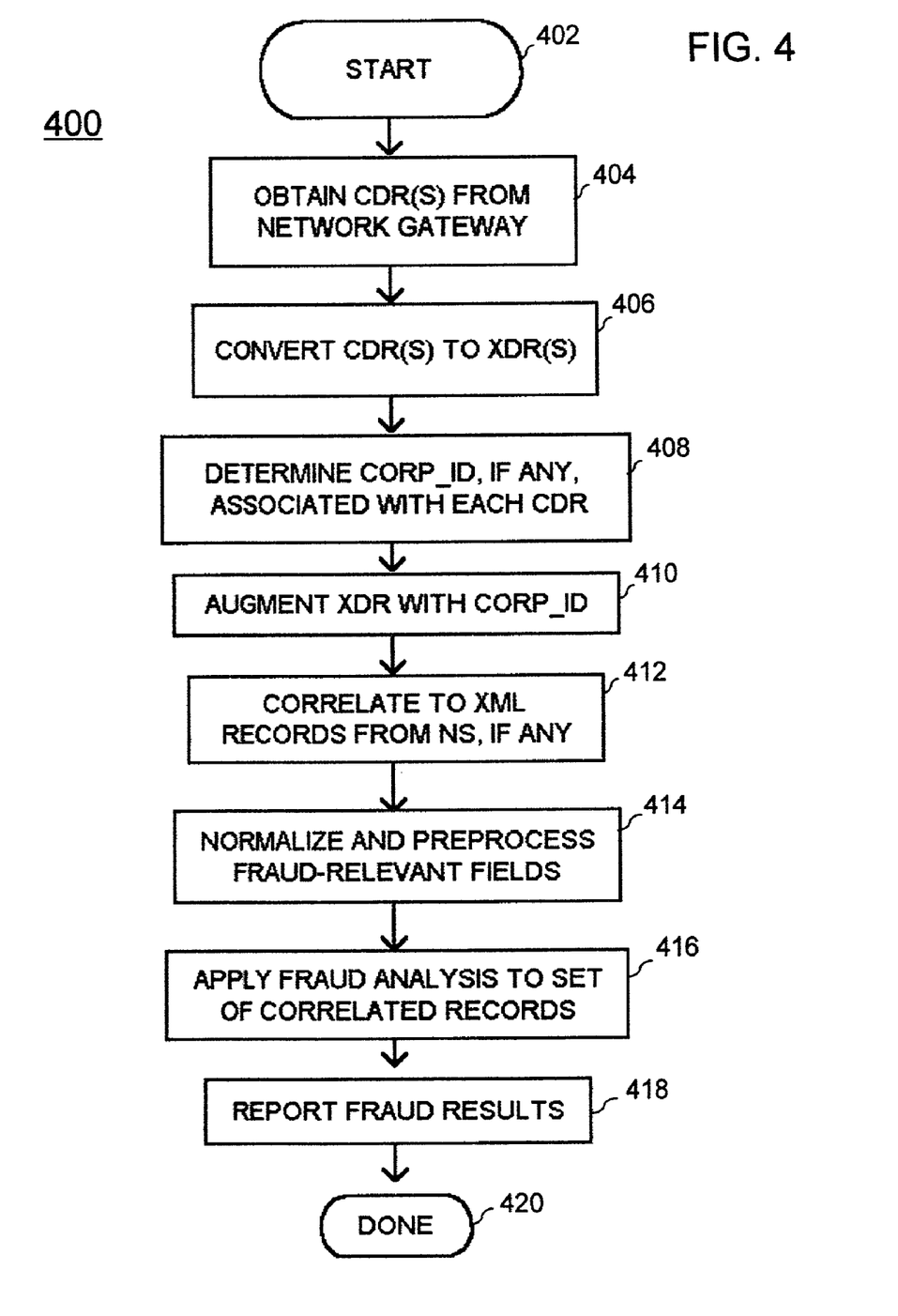
FIG. 4 is a flowchart describing a process for processing records of usage activity from a communications system in accordance with an exemplary embodiment of the present invention.

To now summarize the collective processes of OSS 121 and fraud monitor 133, FIG. 4 generally depicts a process 400 for performing record collection and fraud monitoring in accordance with an exemplary embodiment of the present invention.

In FIG. 4, process 400 begins in step 402 when a fraud analysis is desired. This may be manually triggered network personnel or may be automatically timed to occur. Process 400 may also run continuously depending on the implementation and the desired operation chosen.

Then, in step 404, one or more CDRs are obtained from a network gateway and in step 406, these CDRs are translated into XDRs.

In step 408, a CORP_ID is determined and added to each XDR in step 410. This corresponds to the actions of element 312 and 314 in OSS 121 described earlier.

In step 412, the resulting XDRs stemming from gateway traffic are correlated with those from network servers, if any. It is not essential that any of the latter are present. Consistent with the present teachings, fraud monitor 133 may analyze a body of records that is entirely circuit-switched or entirely packet-switched or any mixture thereof.

Those of skill in the art will recognize that process 400 is merely illustrative and that, in practice, the collection of both CDRs and XDRs will likely take place on an ongoing and concurrent basis and in no particular sequence. The order of steps 404 and 412 depicted in FIG. 4 does not imply strict sequencing. It is also worth noting that the processing steps of process 400 may be divided differently among the OSS 121 and fraud monitor 133 without deviating from the spirit and scope of the present invention.

In step 414, the correlated groups of records are then normalized or pre-processed as described for module 712.

Step 416 involves applying the fraud monitoring algorithms to the observed call parameters and determining whether any fraud patterns are evident therein.

The results of this analysis, whether a list of observations or actual alarms to network personnel, are output in step 418 and then process 400 concludes in step 420.

An exemplary XDR feed to the system 133 may be over a socket-based, TCP/IP connection. The system 133, according to one embodiment of the present invention, employs a "near-real time" delivery of call records; near real-time for this feed means that the OSS 121 will deliver each customized record to the integrated fraud monitoring system 133 within a predetermined time (e.g., in minutes) from the time that the XDR is created. If the TCP connection to the integrated fraud monitoring system 133 is lost, the data is buffered and transmitted when the connection is re-established.

Figure 5:
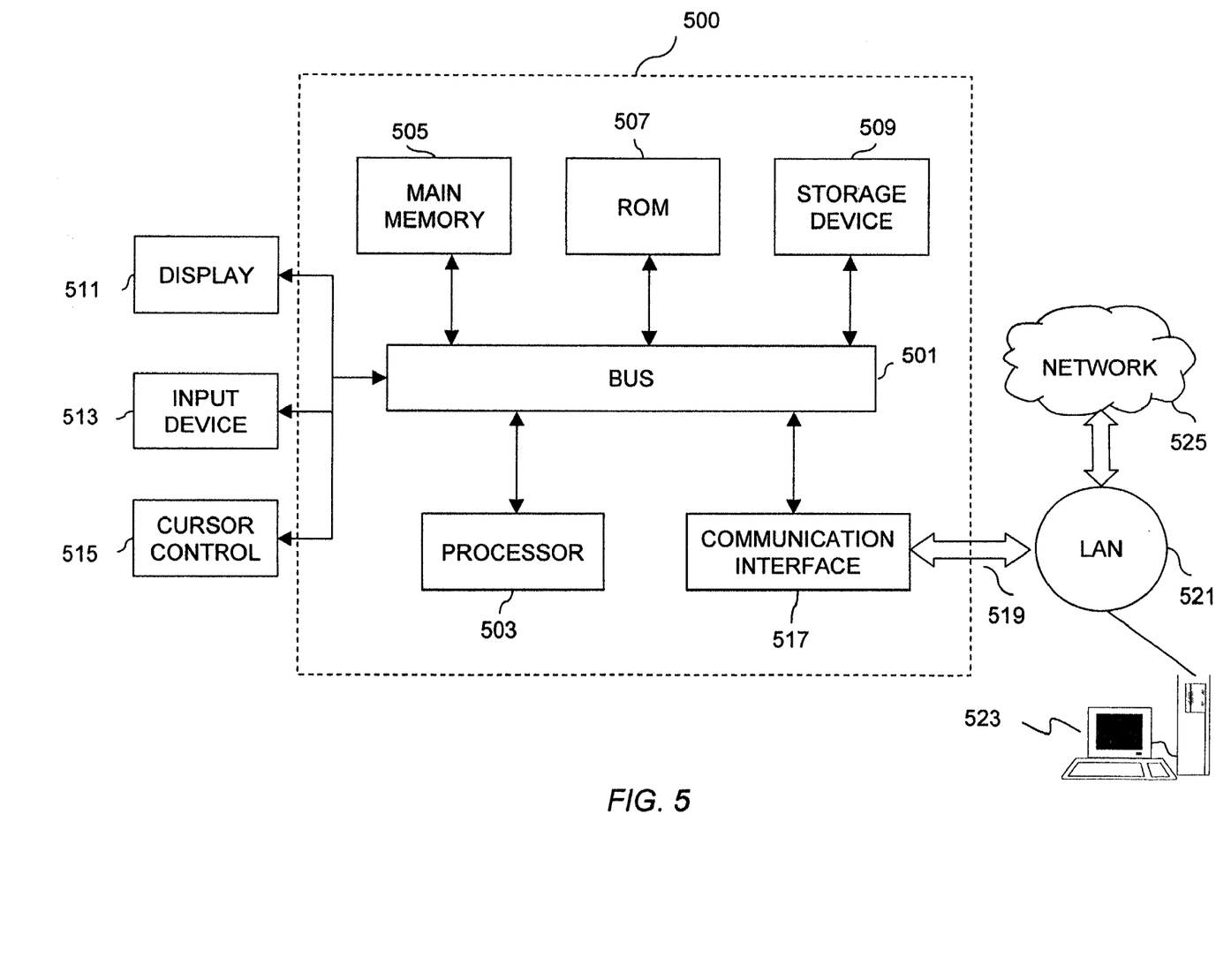
FIG. 5 is a diagram of a computer system with which an embodiment of the present invention may be implemented.

FIG. 5 illustrates a computer system 500 within which an embodiment according to the present invention can be implemented. The computer system 500 includes a bus 501 or other communication mechanism for communicating information, and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions to be executed by the processor 503. The computer system 500 further includes a read only memory (ROM) 507 or other static storage device coupled to the bus 501 for storing static information and instructions for the processor 503. A storage device 509, such as a magnetic disk or optical disk, is additionally coupled to the bus 501 for storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is cursor control 515, such as a mouse, a trackball, or cursor direction keys for communicating direction information and command selections to the processor 503 and for controlling cursor movement on the display 511.

According to one embodiment of the invention, the SIP server functionalities are provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, or a telephone modem to provide a data communication connection to a corresponding type of telephone line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although only a single communication interface 517 is shown, it is recognized that multiple communication interfaces may be employed to communicate with different networks and devices.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by service provider. The local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

The computer system 500 can send messages and receive data, including program code, through the networks, network link 519, and communication interface 517. In the Internet example, a server (not shown) might transmit requested code belonging an application program for implementing an embodiment of the present invention through the network 525, local network 521 and communication interface 517. The processor 504 may execute the transmitted code while being received and/or store the code in storage device 509, or other non-volatile storage for later execution. In this manner, computer system 500 may obtain application code in the form of a carrier wave.

The term "computer-readable medium" as used herein refers to any medium that participates in providing instructions to the processor 504 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Additionally, other interesting information can be found in the following table, in which the cases listed below are incorporated by reference in their entirety:

| item # | U.S. Serial Number (if known) | Attorney Docket Number | Title | Inventor Names | Filing Date |
|---|---|---|---|---|---|
| 1 | | RIC01055 PR | Policy Control and Billing Support for Call Transfer in a SIP Communications Network | Gallant | Mar. 12, 2002 |
| 2 | 09/457,428 | COS99035 | Session Initiation Protocol Servlet Application Programming Interface | Ajay Deo | Dec. 8, 1999 |
| 3 | 09/723,482 | RIC00033 | Distributed Programmable Access Device Network | Howard Thomas, Lei | Nov. 28, 2000 |

-continued

| item # | U.S. Serial Number (if known) | Attorney Docket Number | Title | Inventor Names | Filing Date |
|---|---|---|---|---|---|
| 4 | 09/723,481 | RIC00042 | Distributed Programmable Access Device Network Supported by Separate Service Controllers | Yao, David McDysan Howard Thomas, Lei | Nov. 28, 2000 |
| 5 | 09/723,501 | RIC00043 | Distributed Programmable Access Device Network Supported by Separate Service Controllers | Yao, David McDysan Howard Thomas, Lei | Nov. 28, 2000 |
| 6 | 09/723,480 | RIC00044 | Distributed Programmable Access Device Network Supported by Separate Service Controllers | Yao, David McDysan Howard Thomas, Lei Yao, David McDysan | Nov. 28, 2000 |
| 7 | 09/983,691 | RIC01001 | SIP (Session Initiation Protocol) User Agent and Special Forking Proxy Server | Alan Johnston | Oct 25, 2001 |
| 8 | 09/983,689 | RIC01003 | Voice Over IP Quality Indicator | Alan Johnston | Oct. 25, 2001 |
| 9 | 10/016,109 | RIC01004 | Small Office or Home Office (SOHO) IP Phone Service | Steven Lass, Alan Johnston, Henry Sinnreich | Dec. 17, 2001 |
| 10 | 10/016,874 | RIC01030 | Method of Providing External Echo Control in the IP Communications | Gregory Paterno | Dec. 14, 2001 |
| 11 | 10/016,111 | RIC01035 | SIP Call Charging Notification | Alan Johnston | Dec. 17, 2001 |
| 12 | 10/016,110 | RIC01036 | Network Based SIP Music on Hold | Alan Johnston | Dec. 17, 2001 |
| 13 | 09/280,732 | RIC98021 | Multimedia Interface to Support Sessions in IP Telephony | John Truetken | Mar. 29, 1999 |
| 14 | 09/370,504 | RIC98047 | Dynamic Invocation of Data Signaling Via Temporary Address Proxy | Steven Donovan, John Gallant | Aug. 9, 1999 |
| 15 | 09/332,777 | RIC98049 | Internet Transport of PSTN to PSTN Telephony Services | Matthew Cannon | Jun. 14, 1999 |
| 16 | 09/364,005 | RIC98050 | Address Definition for IP Telephony Services | Steven Donovan, Matthew Cannon | Jul. 29, 1999 |
| 17 | 09/405,409 | RIC98051 | Network-Based SIP Services | Steven Donovan, John Gallant | Sep. 24, 1999 |
| 18 | 09/364,536 | RIC98052 | SIP/IP Extended DAL | Steven Donovan, Matthew Cannon | Jul. 29, 1999 |
| 19 | 09/406,910 | RIC98054 | Real-Time Authentication of Digital Data | David Hayes | Sep. 24, 1999 |
| 20 | 09/538,708 | RIC99009 | Method and Apparatus for Internet-Based Telephone Access to Prepaid Card and PIN Systems | Yali Liu | Mar. 30, 2000 |
| 21 | 09/441,438 | RIC99014 | Method and System For Releasing a Voice Response Unit from a Protocol Session | Steven Donovan, Cannon, Hearty | Nov. 17, 1999 |
| 22 | 09/416,101 | RIC99027 | Customer Resources Policy Control for IP Traffic Delivery | Steven Donovan, Gallant, Rawlins | Oct. 12, 1999 |
| 23 | 09/420,656 | RIC99050 | Method and System for Using Caller Pays Service for Single Use and Short Term Access to Internet Subscription Services | William Hardy | Oct. 19, 1999 |
| 24 | 09/481,910 | RIC99051 | Method and Apparatus for Providing Reliable Communications in an Intelligent Network | Terry Caterisano Donovan, Gallant, Barnhouse, McMurry | Jan. 12, 2000 |

-continued

| item # | U.S. Serial Number (if known) | Attorney Docket Number | Title | Inventor Names | Filing Date |
|---|---|---|---|---|---|
| 25 | 09/436,795 | RIC99055 | Internet Protocol Telephony Voice/Video Message Deposit and Retrieval | Steven Donovan | Nov. 8, 1999 |
| 26 | 09/436,794 | RIC99056 | Methods for Providing IP Telephony with QoS Using End-To-End RSVP Signaling | Steven Donovan | Nov. 8, 1999 |
| 27 | 09/586,203 | RIC99056 CP | Method for Providing IP Telephony with QoS Using End-to-End RSVP Signaling | Steven Donovan | Jun. 2, 2000 |
| 28 | 09/435,540 | RIC99057 | Method of Combining Internet Protocols For Session Setup, Teardown, Authentication, Authorization, and Accounting Using the Dif | Steven Donovan | Nov. 8, 1999 |
| 29 | 09/436,294 | RIC99058 | Methods for Providing Prepaid Telephony Service via an Internet Protocol Network System | Steven Donovan | Nov. 8, 1999 |
| 30 | 09/436,793 | RIC99059 | SIP-Based Feature Control | Steven Donovan, Devanathan | Nov. 8, 1999 |
| 31 | 09/436,796 | RIC99060 | Method and System for Dynamic Gateway Selection in an IP Telephony Network | Steven Donovan, Gallant | Nov. 8, 1999 |
| 32 | 09/564,876 | RIC99060 P1 | Method and System for Dynamic Gateway Selection in an IP Telephony Network | Steven Donovan, Gallant | May. 4, 2000 |
| 33 | 09/436,794 | RIC99070 | Interdomain IP Communications with QoS, Authorization and Usage Reporting | Steven Donovan, Thomas, Sinnreich, Rawlins | Nov. 8, 1999 |
| 34 | 60/163,913 | RIC99070 PR | Interdomain IP Communications with QoS, Authorization and Usage Reporting | Steven Donovan, Thomas, Sinnreich, Rawlins | Nov. 5, 1999 |

While the present invention has been described in connection with a number of embodiments and implementations by way of example, the present invention is not limited to such embodiments. Those of ordinary skill in the art will recognize that many implementations are possible within the spirit and scope of the invention as may be construed from the following claims.

What is claimed is:

1. A method for monitoring activity in a communications system comprising the steps of:
obtaining at least one first record relating to a first transport network, wherein the first transport network is a circuit-switched network;
obtaining at least one second record relating to a second transport network, wherein the second transport network is a data network;
determining that the first record and second record are both associated with a communication session;
determining at least one aspect of the communications session based upon content of both the first record and the second record; and
generating a fraud alert based on the determined aspect of the communication session.

2. The method of claim 1 wherein the first record is formatted differently than the second record.

3. The method of claim 1 wherein at least one of the first record and the second record pertains to the action of a gateway coupling the first transport and the second transport network.

4. The method of claim 1 further comprising the step of combining the first record with the second record to form a composite record of activity.

5. The method of claim 4 further comprising the step of converting the first record into the format of the second record.

6. The method of claim 4 further comprising the step of translating both the first record and second record into a common format.

7. The method of claim 4 further comprising the step of adding to the first record additional information related to at least one aspect of the second transport network.

8. The method of claim 7 wherein the additional information is an address in an address space of the second transport network.

9. The method of claim 1 wherein the communications session is a voice call supported by the first transport network and the second transport network.

10. The method of claim 9 wherein the first record is based on a Call Detail Record (CDR)-type format, and the second record is based on an eXtensible Mark-up Language (XML)-type format.

11. A method for supporting fraud monitoring, the method comprising the steps of:
collecting a first transaction record associated with a circuit-switched network;
collecting a second transaction record associated with a packet-switched network, wherein the first transaction record and the second transaction record correspond to a common communication session transported by the circuit-switched network and the packet-switched network;

generating a third transaction record from the first transaction record and the second transaction record; and generating a fraud alert based on the third transaction record associated with the common communication session.

12. A method according to claim 11, further comprising the steps of:

determining an identifier corresponding to the first transaction record and the second transaction record; and augmenting the third transaction record with the determined identifier.

13. A method according to claim 11, wherein the third transaction record is based on an eXtensible Mark-up Language (XML)-type format.

14. A system for supporting fraud monitoring, the system comprising:

a first receiver configured to collect a first transaction record associated with a circuit-switched network;

a second receiver configured collect a second transaction record associated with a packet-switched network, wherein the first transaction record and the second transaction record correspond to a common communication session transported by the circuit-switched network and the packet-switched network; and a record converter configured to generate a third transaction record from the first transaction record and the second transaction record, wherein a fraud alert is generated based on the third transaction record associated with the common communication session.

15. A system according to claim 14, further comprising:

means for determining an identifier corresponding to the first transaction record and the second transaction record; and means for augmenting the third transaction record with the determined identifier.

16. A system according to claim 14, wherein the third transaction record is based on an eXtensible Mark-up Language (XML)-type format.

* * * * *